(12) United States Patent
Shiraishi et al.

(10) Patent No.: US 6,442,361 B1
(45) Date of Patent: Aug. 27, 2002

(54) VARIABLE SPEED IMAGE FORMATION APPARATUS AND METHOD

(75) Inventors: Mitsuo Shiraishi, Sunto-gun; Toshiyuki Sekiya, Mishima, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/692,456

(22) Filed: Oct. 20, 2000

(30) Foreign Application Priority Data

Oct. 26, 1999 (JP) .......................................... 11-304117

(51) Int. Cl.[7] ..................... G03G 15/00; G03G 15/04; B41J 2/435
(52) U.S. Cl. ..................... 399/130; 347/246; 399/177
(58) Field of Search ..................... 399/51, 130, 177, 399/4; 347/246, 247, 250

(56) References Cited

U.S. PATENT DOCUMENTS

| | | | | |
|---|---|---|---|---|
| 4,916,489 A | * | 4/1990 | Takeda | 347/115 X |
| 5,043,745 A | * | 8/1991 | Inoue et al. | 347/246 |
| 5,177,405 A | | 1/1993 | Kusuda et al. | 315/169.1 |
| 5,451,977 A | | 9/1995 | Kusuda et al. | 345/44 |
| 6,002,420 A | | 12/1999 | Tanioka et al. | 347/237 |

FOREIGN PATENT DOCUMENTS

| | | |
|---|---|---|
| JP | 01-238962 | 9/1989 |
| JP | 02-208067 | 8/1990 |
| JP | 02-212170 | 8/1990 |
| JP | 03-020457 | 1/1991 |
| JP | 03-194978 | 8/1991 |
| JP | 04-005872 | 1/1992 |
| JP | 04-023367 | 1/1992 |
| JP | 04-296579 | 10/1992 |
| JP | 05-084971 | 4/1993 |

OTHER PUBLICATIONS

"Proposal of Integrated Light Emitting Device Array with Drive Circuit for Photo–Printer," Japan Hard–Copy Memoir 1991 (A–17).

"Proposal of Self–Scanning Type Light Emission Element (SLED) Using PNPN Thyristor Structure," IEICE (Mar. 5, 1990).

\* cited by examiner

*Primary Examiner*—Fred L Braun
(74) *Attorney, Agent, or Firm*—Fitzpatrick, Cella, Harper & Scinto (57) ABSTRACT

A method and apparatus for reducing image unevenness due to light emission of a transfer element. Namely, when a printing speed is changed to $1/2^n$ (n is a positive integer), a SLED head controller repeats a cycle to perform exposure control for one line and then stops the exposure control for the lines corresponding to $1/2^n$ speed. For example, in the 1/2 speed (i.e., n=1), transfer and light emission driving are performed at an initially set maximum speed, and the cycle when the exposure control for one line is stopped after the one-line exposure control is repeated. The printing speed is changed on the basis of the type or kind of recording medium used.

16 Claims, 9 Drawing Sheets

VARIABLE SPEED IMAGE FORMATION APPARATUS AND METHOD

BACKGROUND OF THE INVENTION

1. Field of the Invention

The present invention relates to an image formation apparatus which contains a one-dimensional light emission element array for recording, and more particularly to an image formation apparatus of which image formation speed can be changed into the speed previously related to an image formation mode.

2. Related Background Art

A self-scanning type LED array (called a SLED hereinafter) has been introduced in Japanese Patent Application (Laid Open) Nos. 1-238962, 2-208067, 2-212170, 3-194978, 4-5872, 4-23367, 4-296579 and 5-84971, Japanese Utility Model No. 3-20457, Japan Hard-copy Memoir 1991 (A-17) "Proposal of Light Emission Element Array for Light Printer in which Driving Circuits Have Been Integrated", IEICE (Institute of Electronics, Information and Communication Engineers) Memoir (Mar. 5, 1990) "Proposal of Self-Scanning Type Light Emission Element (SLED) Using PNPN Thyristor Structure", and the like, and has been paid attention to as a light emission element for recording.

Figure 8:
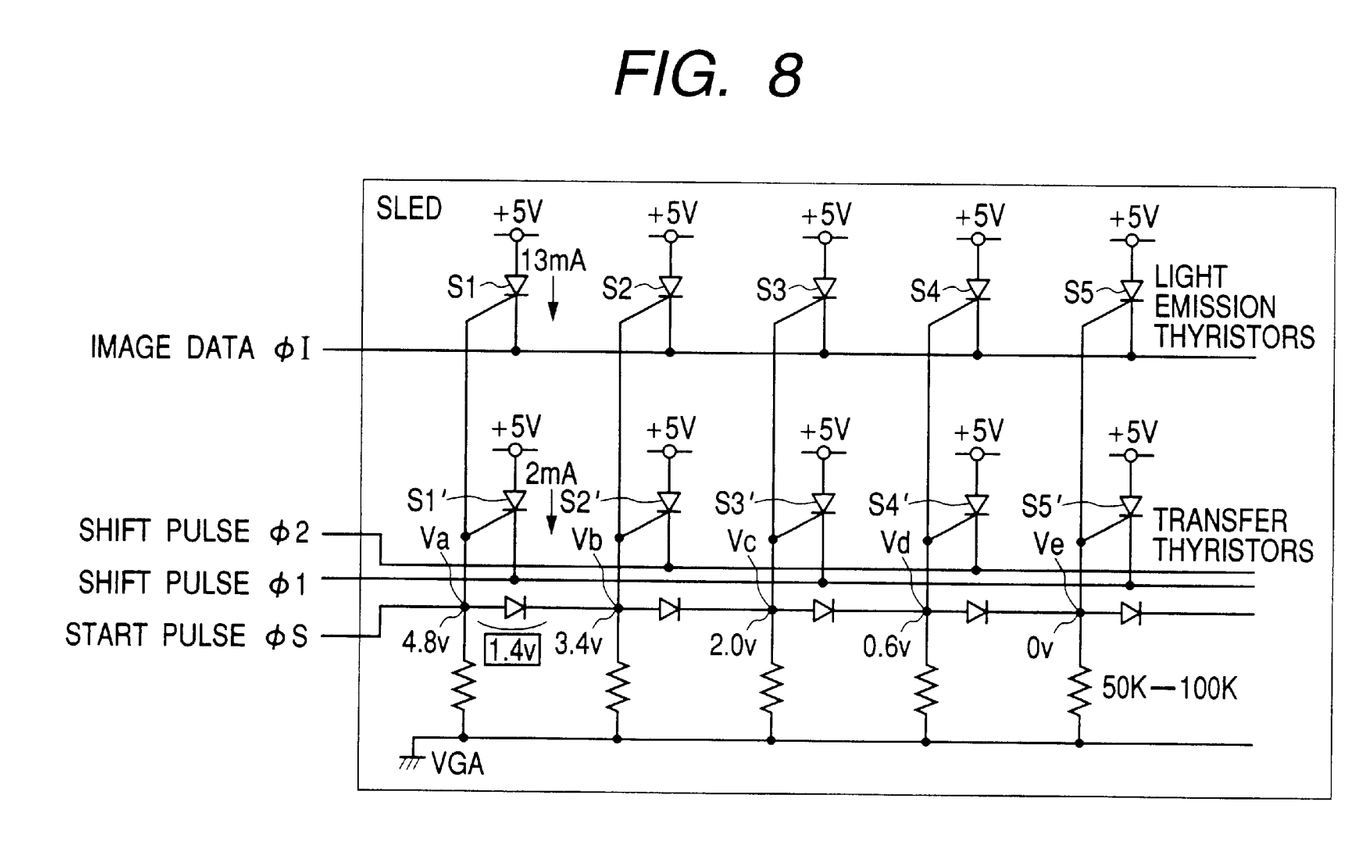
FIG. 8 is a circuit diagram showing an example of a structure of a SLED.
Figures 9A, 9B:
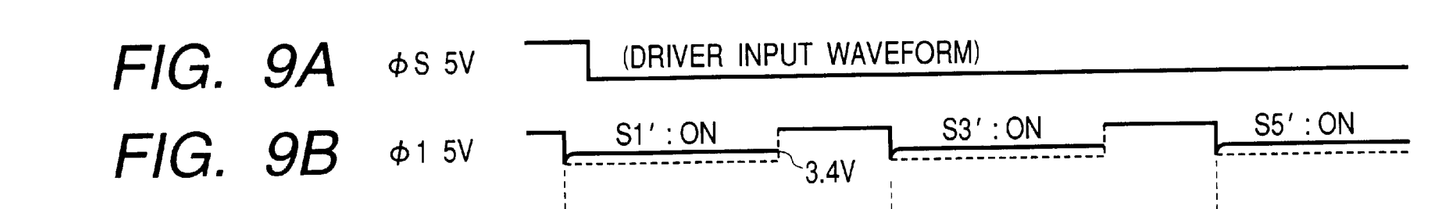
FIGS. 9A, 9B, 9C, 9D, 9E, 9F, 9G, 9H and 9I are timing charts for explaining operations of the SLED shown in FIG. 8.
Figure 9C:
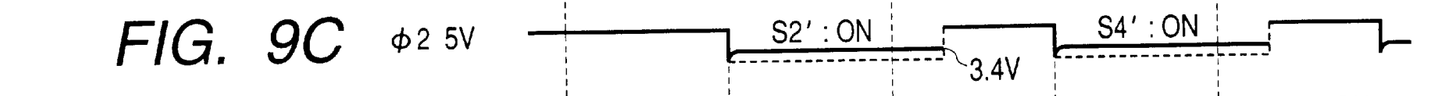
Figure 9D:
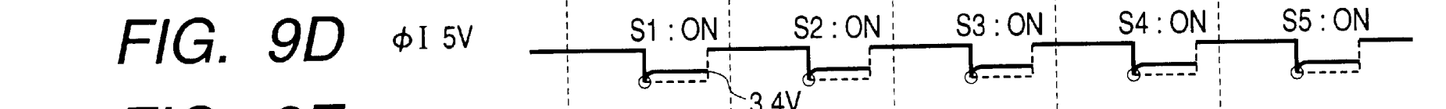
Figure 9E:
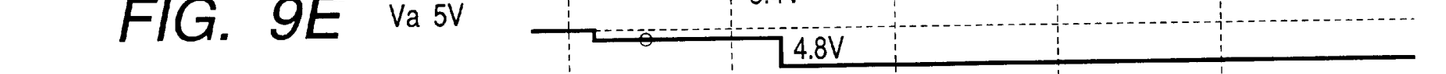
Figure 9F:
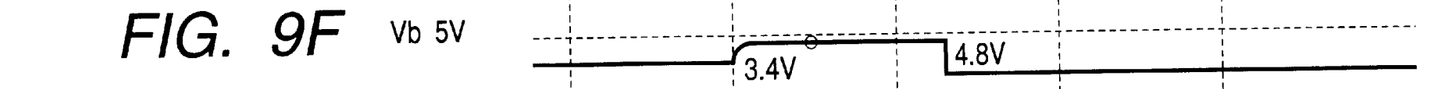
Figure 9G:
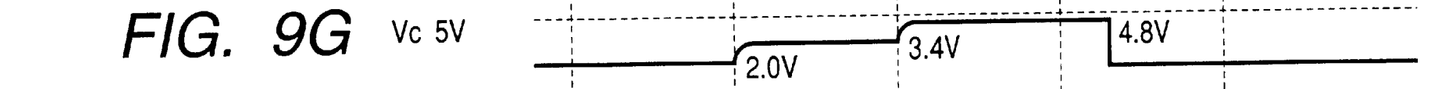
Figure 9H:
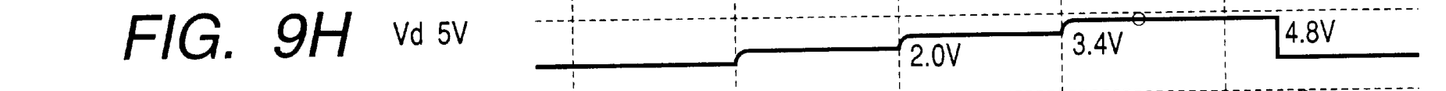
Figure 9I:
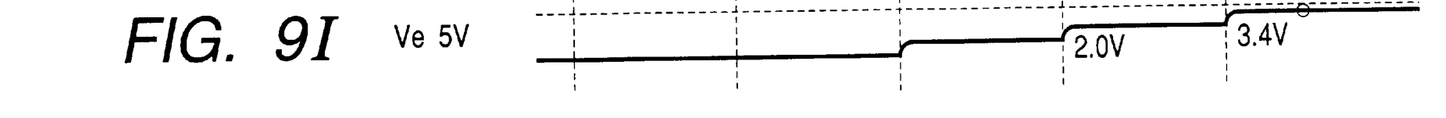

Next, an operation in a case where all of light emission elements in a circuit shown in FIG. 8 are lit will be explained with reference to timing charts shown in FIGS. 9A to 9I. When the levels of shift pulses $\phi 1$ and $\phi 2$ are 5V respectively, and when the level of a start pulse $\phi S$ is changed from 0V to 5V in the state that the level of image data $\phi I$ is 5V, a voltage Va of a node a becomes Va=5V, a voltage Vb of a node b becomes Vb=3.7V (it is assumed that forward voltage drop of a diode is 1.3V), a voltage Vc of a node c becomes Vc=2.4V, a voltage Vd of a node d becomes Vd=1.1V, and a voltage Ve of a node e and voltages of following nodes become Ve=0V (FIGS. 9E to 9I), whereby the level of the gate signal of a thyristor for transfer (simply referred as a transfer thyristor hereinafter) S1' is changed from 0V to 5V and the level of the gate signal of a transfer thyristor S2' is changed from 0V to 3.7V.

In this state, when the level of the shift pulse $\phi 1$ is changed from 5V to 0V (FIG. 9B), the anode, cathode and gate voltages of the transfer thyristor S1' become 5V, 0V and 3.7V respectively, thereby satisfying an ON condition of the transfer thyristor. Thus, the transfer thyristor S1' is turned on. Even if the level of the start pulse $\phi S$ is changed to 0V in this state (FIG. 9A), the voltage Va of the node a becomes Va ≅ 5V (FIG. 9E). This is because the start pulse $\phi S$ is supplied through a resistor, and a voltage between the anode and a gate of the thyristor becomes substantially identical when the thyristor is turned on. Thus, even if the level of the start pulse $\phi S$ is changed to 0V, the ON condition of the first thyristor is maintained, and a first shift operation ends.

In this state, when the level of the shift pulse $\phi 1$ for the light emission thyristor is changed from 5V to 0V, the condition the same as the ON condition of the transfer thyristor is satisfied, whereby a light emission thyristor S1 is turned on, and the first light emission thyristor is lit. In the first thyristor, when the level of the shift pulse $\phi 1$ is returned to 5V (FIG. 9B), a voltage difference between the anode and cathode of the light emission thyristor becomes zero, and thus a minimum holding current of the thyristor cannot flow, whereby the light emission thyristor S1 is turned off.

Next, transfer of the ON condition of the thyristor from the transfer thyristor S1' to the transfer thyristor S2' will be explained. Since the level of the shift pulse $\phi 1$ is maintained to 0V even if the light emission thyristor S1 is turned off, the transfer thyristor S1' is still on, and the gate voltage (i.e., the voltage of the node a) of the transfer thyristor S1' satisfies Va≅5V. Further, the voltage Vb of the node b satisfies Vb=3.7V.

In this state, when the level of the shift pulse $\phi 2$ is changed from 5V to 0V (FIG. 9C), the anode voltage of the transfer thyristor S2' becomes 5V, the cathode voltage thereof becomes 0V, and the gate voltage thereof becomes 3.7V (FIG. 9F), whereby the transfer thyristor S2' is turned on. After the transfer thyristor S2' has been turned on, when the level of the shift pulse $\phi 1$ is changed from 0V to 5V (FIG. 9B), the transfer thyristor S1' is turned off as well as the light emission thyristor S1 being turned off. Thus, the ON condition of the transfer thyristor is shifted from the thyristor S1' to the thyristor S2'. Then, when the level of the shift pulse $\phi 1$ is changed from 5V to 0V (FIG. 9B), a light emission thyristor S2 is turned on and lit.

The reason why only the light emission thyristor corresponding to the transfer thyristor which is on can perform light emission is as follows. Namely, when the transfer thyristor is not on, since the gate voltages of the thyristors except for the thyristor adjacent to the thyristor which is on are 0V, the ON condition of the thyristor is not satisfied. With respect to the adjacent thyristor, when the light emission thyristor is turned on, the voltage level of the shift pulse $\phi 1$ becomes 3.4V (corresponding to forward voltage drop of the light emission thyristor). Thus, since a voltage difference between the gate and cathode of the adjacent thyristor is zero, this thyristor cannot be turned on.

An SLED head in which SLED chips each having such the circuit structure as shown in FIG. 8 are arranged in array can output a light quantity necessary to expose a photosensitive body of the image formation apparatus, by the light emission of the light emission thyristor.

In a conventional printer which uses the SLED head, when printer speed is changed, also SLED driving speed is changed according to the printer speed. Conversely, although the SLED driving speed is not changed, a driving operation for the transfer thyristor in the SLED is not stopped but continuously driven even in a printing line to which any exposure is not necessary.

However, although the transfer thyristor which sequentially shifts light emission bits with respect to the light emission thyristor has the same structure as that of the light emission thyristor, a light emission quantity of the transfer thyristor is smaller than that of the light emission thyristor. For this reason, when this SLED head is used as the exposure source of the printer, there is a problem that slight light quantity unevenness occurs due to the light emission of the transfer thyristor.

Especially, in a case where printing speed of the printer is variable and rotating speed of a photosensitive drum is lowered, if transfer of the SLED head is delayed and also driving of the light emission thyristor is delayed, a duty of exposure for one line of the photosensitive drum increases, whereby a light emission time of the transfer thyristor is prolonged. For this reason, there is a problem that light quantity unevenness occurs due to the light emission of the transfer thyristor, and image unevenness resultingly thickens and becomes hard.

Further, in a case where the printer speed is adjusted to $1/2^n$, when the driving is performed without changing the SLED transfer speed and the light emission (exposure) speed, the SLED is kept driven without stopping the above transfer operation for each line. Thus, the transfer thyristor performs the light emission even when the exposure by the light emission thyristor is not performed, whereby there is a problem that image unevenness occurs due to a light emission quantity of a $2^n$-multiple transfer unit.

SUMMARY OF THE INVENTION

An object of the present invention is to provide an image formation apparatus which can solve the above-described problems and reduce image unevenness due to light emission of a transfer element.

In order to achieve the above object, the present invention is characterized by providing an image formation apparatus which can change process speed, the apparatus comprising:

a recording element array having plural recording elements to perform recording on a recording medium;

scanning means for scanning the recording element array;

control means for performing control in a low process speed mode such that a non-recording time during which no image is recorded is inserted between a recording time during which image data of one line is recorded and a recording time during which image data of next one line is recorded; and inhibition means for inhibiting the scanning means from scanning the recording element array in the non-recording time of the low process speed mode.

Further, the present invention is characterized by providing an image formation method in which process speed can be changed and a recording element array is used, the method comprising the steps of:

in a low process speed mode, providing a recording time during which an image of one line is recorded, and a non-recording time, during which no image is recorded, between the recording time and a recording time during which an image of next one line is recorded;

scanning the recording element array to drive a recording element on the basis of image data in the recording time; and inhibiting the scanning to the recording element in the non-recording time.

Other objects and features of the present invention will become apparent from the following detailed description and the attached drawings.

DETAILED DESCRIPTION OF THE PREFERRED EMBODIMENTS

Hereinafter, the embodiments of the present invention will be explained in detail with reference to the attached drawings.

Figure 1:
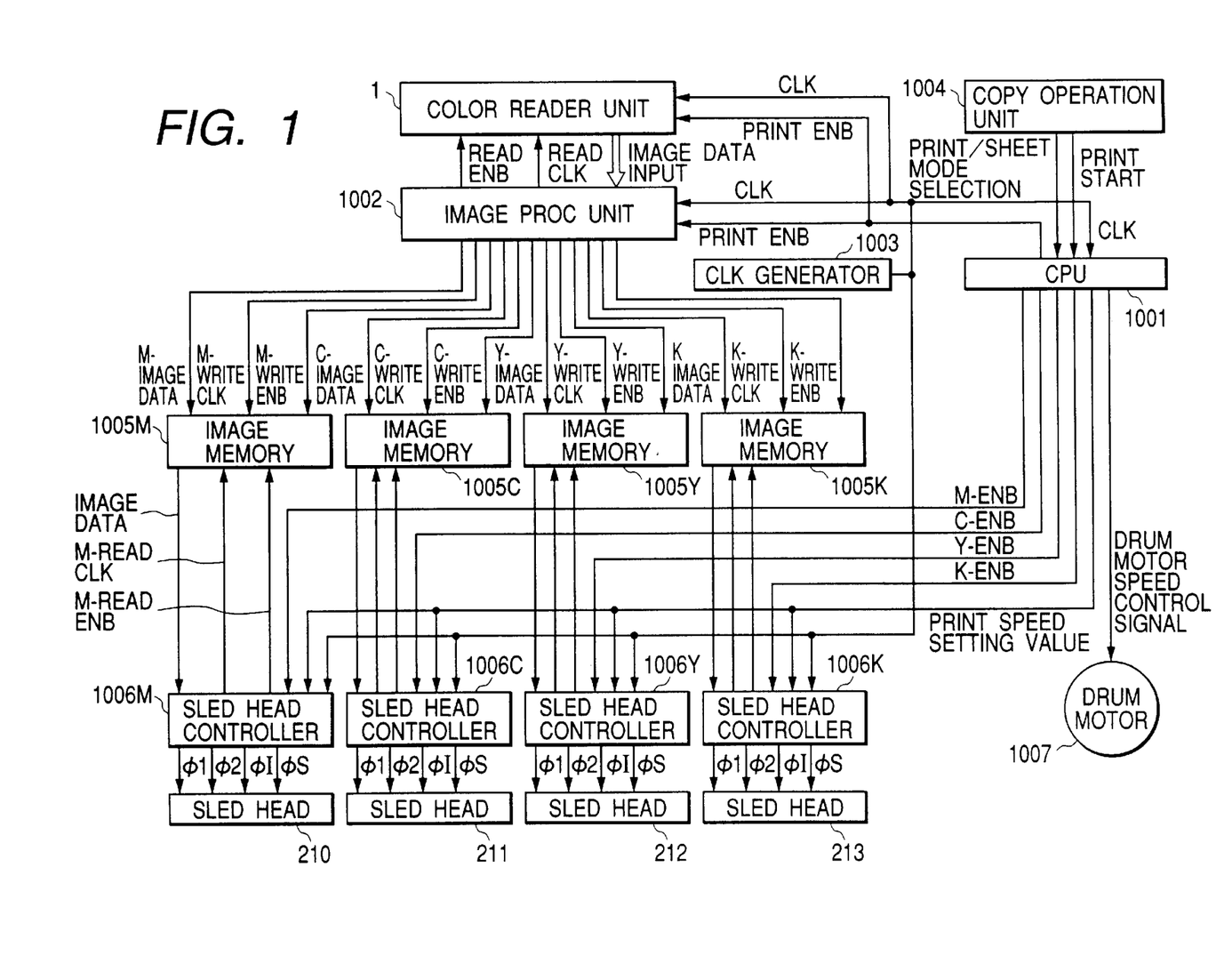
FIG. 1 is a block diagram showing one embodiment of the present invention.
Figure 2:
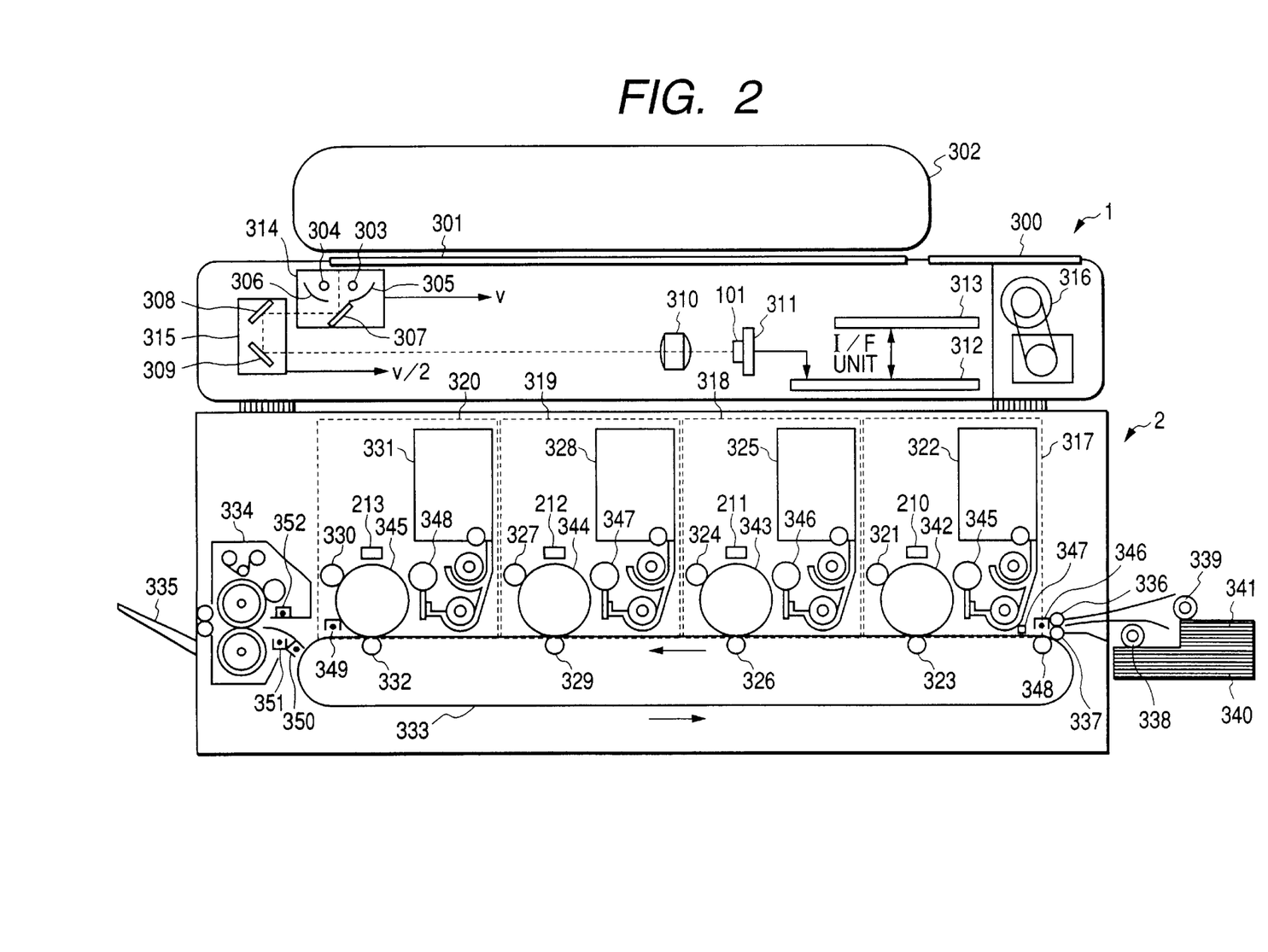
FIG. 2 is a sectional diagram showing an example of a structure of a color image formation apparatus according to the embodiment.

FIG. 1 shows the first embodiment of the present invention. The first embodiment is directed to an example of a color image formation apparatus which is composed of a color reader unit 1 and a printer unit 2. FIG. 2 shows a structure of the color image formation apparatus.

First, the color reader unit 1 will be explained with reference to FIG. 2. In FIG. 2, numeral 301 denotes a platen glass on which an original is put. Numeral 302 denotes an original feeder which sequentially feeds stacked originals onto the platen glass 301. It is possible to use, instead of the original feeder 302, a mirror pressure board or a white pressure board.

Numeral 314 denotes a carriage which contains light sources 303 and 304, parabolic reflectors 305 and 306, and a mirror 307. The light sources 303 and 304 irradiate the original on the platen glass 301. A halogen lamp or a fluorescent lamp is used as each of the light sources 303 and 304. The parabolic reflectors 305 and 306 respectively condense light from the light sources 303 and 304 to the original. The mirror 307 guides reflection light from the original on the platen glass 301 or projection light to a carriage 315. The carriage 315 which contains mirrors 308 and 309 guides light from the carriage 314 to an imaging lens 310. Numeral 101 denotes a CCD (charge-coupled device) which converts a light signal from the imaging lens 310 into an electrical signal. Numeral 311 denotes a substrate on which the CCD 101 is installed. The carriages 314 and 315 are mechanically moved in a direction perpendicular to an electrical scanning direction (a main scanning direction) of the CCD 101 respectively at speeds V and V/2, whereby the entire face of the original is scanned (in a sub scanning direction).

Numeral 312 denotes a printer process unit which processes an image signal from the CCD 101, and drives and controls SLED heads 210, 211, 212 and 213 (FIG. 2) each having a one-dimensional light emission element array. The structure of the printer process unit 312 is shown in FIG. 1. Numeral 313 denotes an interface (I/F) unit which interfaces with other CPU and the like.

Next, the printer unit 2 will be explained with reference to FIG. 2. Numeral 341 denotes a cassette which contains transfer materials, numeral 339 denotes a pickup roller which separates transfer materials one by one from the cassette 341, numeral 340 denotes a cassette which contains transfer materials, and numeral 338 denotes a pickup roller which separates transfer materials one by one from the cassette 340. Numerals 336 and 337 denote sheet feed rollers which feed the transfer materials respectively separated from the cassettes 340 and 341 onto a transfer material carrying belt 333.

Numeral 346 denotes an adsorption electrifier which cooperates with a transfer material carrying belt roller 348 to electrify the transfer materials fed by the sheet feed rollers 336 and 337, whereby the transfer materials are adsorbed to the transfer material carrying belt 333. The transfer material carrying belt roller 348 drives the transfer material carrying belt 333. It is possible to dispose, on the opposite side of the transfer material carrying belt roller 348, a driving roller for driving the transfer material carrying belt 333. Numeral 347 denotes a sheet leading edge detector which detects the leading edge of the transfer material on the transfer material carrying belt 333. A detection signal from the sheet leading edge detector 347 is transferred from the printer unit 2 to the color reader unit 1, and used as a sub scanning sync signal in case of transferring a video signal from the color reader unit 1 to the printer unit 2.

Numeral 317 denotes a magenta (M) image formation unit, numeral 318 denotes a cyan (C) image formation unit, numeral 319 denotes an yellow (Y) image formation unit, and numeral 320 denotes a black (K) image formation unit. These image formation units 317 to 320 have substantially the same structure.

The M image formation unit 317 will be explained. Numeral 342 denotes a photosensitive drum on which a latent image is formed based on light from the SLED head 210. Numeral 321 denotes a primary electrifier which electrifies the surface of the photosensitive drum 342 at a predetermined voltage to prepare the image formation. Numeral 322 denotes a development unit which develops the latent image formed on the photosensitive drum 342 to form a toner image. The development unit 322 contains a sleeve 345 which applies a development bias for development. Numeral 323 denotes a transfer electrifier which discharges to the back of the transfer material carrying belt 333 to transfer the toner image on the photosensitive drum 342 to a recording sheet on the belt 333. Since the M image formation unit 317 has excellent transfer efficiency, this unit 317 does not have any cleaner unit. However, it is possible to provide a cleaner unit which performs cleaning of the photosensitive drum 342.

The C image formation unit 318 will be explained. Numeral 343 denotes a photosensitive drum on which a latent image is formed based on light from the SLED head 211. Numeral 324 denotes a primary electrifier which electrifies the surface of the photosensitive drum 343 at a predetermined voltage to prepare the image formation. Numeral 325 denotes a development unit which develops the latent image formed on the photosensitive drum 343 to form a toner image. The development unit 325 contains a sleeve 346 which applies a development bias for development. Numeral 326 denotes a transfer electrifier which discharges to the back of the transfer material carrying belt 333 to transfer the toner image on the photosensitive drum 342 to a recording sheet on the belt 333. Since the C image formation unit 318 also has excellent transfer efficiency, this unit 318 does not have any cleaner unit. However, it is possible to provide a cleaner unit which performs cleaning of the photosensitive drum 343.

The Y image formation unit 319 will be explained. Numeral 344 denotes a photosensitive drum on which a latent image is formed based on light from the SLED 212. Numeral 327 denotes a primary electrifier which electrifies the surface of the photosensitive drum 344 at a predetermined voltage to prepare the image formation. Numeral 328 denotes a development unit which develops the latent image formed on the photosensitive drum 344 to form a toner image. The development unit 328 contains a sleeve 347 which applies a development bias for development. Numeral 329 denotes a transfer electrifier which discharges to the back of the transfer material carrying belt 333 to transfer the toner image on the photosensitive drum 344 to a recording sheet on the belt 333. Since the Y image formation unit 319 also has excellent transfer efficiency, this unit 319 does not have any cleaner unit. However, it is possible to provide a cleaner unit which performs cleaning of the photosensitive drum 344.

The K image formation unit 320 will be explained. Numeral 345 denotes a photosensitive drum on which a latent image is formed based on light from the SLED head 213. Numeral 330 denotes a primary electrifier which electrifies the surface of the photosensitive drum 345 at a predetermined voltage to prepare the image formation. Numeral 331 denotes a development unit which develops the latent image formed on the photosensitive drum 345 to form a toner image. The development unit 331 contains a sleeve 348 which applies a development bias for development. Numeral 332 denotes a transfer electrifier which discharges to the back of the transfer material carrying belt 333 to transfer the toner image on the photosensitive drum 345 to a recording sheet on the belt 333. Since the K image formation unit 320 also has excellent transfer efficiency, this unit 320 does not have any cleaner unit. However, it is possible to provide a cleaner unit which performs cleaning of the photosensitive drum 345.

Next, the structure shown in FIG. 1 will be explained. In FIG. 1, numerals 1, 210, 211, 212 and 213 denote the same parts as those shown in FIG. 2 respectively. Numeral 1001 denotes a CPU (central processing unit) which controls each unit of the color image formation apparatus. Numeral 1002 denotes image process unit which performs color correction, color conversion (converting R, G and B images into Y, M, C and K images) and binarization which are suitable for the color image formation apparatus. Numeral 1003 denotes a clock generation unit which generates a main clock, and numeral 1007 denotes a drum motor which drives the photosensitive drums 342 to 345. Numerals 1005M, 1005C, 1005Y and 1005K denote image memories which store M image data, C image data, Y image data and K (black) image data supplied from the image process unit 1002, respectively. Numerals 1006M, 1006C, 1006Y and 1006K denote SLED head controllers which respectively control the SLED heads 210, 211, 212 and 213 on the basis of the M, C, Y and K image data from the image memories 1005M, 1005C, 1005Y and 1005K.

Next, an exposure control operation will be explained. When a copy operation unit 1004 is handled and thus a print start signal to start printing is output, the CPU 1001 which receives this print start signal supplies an image output start signal (a print enable signal) to the image process unit 1002. Then, the image process unit 1002 which received this image output start signal supplies a read enable signal for obtaining image data to the color reader unit 1, reads the image data from the color reader unit 1, and performs the color correction, the color conversion (converting the R, G and B images into the Y, M, C and K images) and the binarization suitable for the color image formation apparatus.

When the image process ends, the image process unit 1002 supplies the image data obtained in the image process, and write clocks and write enable signals for writing the image data to the image memories 1005M, 1005C, 1005Y and 1005K respectively corresponding to the M, C, Y and K image formation units 317, 318, 319 and 320, thereby writing the M, C, Y and K image data in the image memories 1005M, 1005C, 1005Y and 1005K respectively.

Then, according to printing speed, the CPU 1001 outputs enables signals M-ENB, C-ENB, Y-ENB and K-ENB respectively corresponding to the M, C, Y and K image formation units 317, 318, 319 and 320 in the order of M, C, Y and K. Although the printing speed has been initialized to be maximum in ordinary printing, an operator can set a print mode (a standard image quality mode or a high image quality mode) and a kind of sheet (an ordinary sheet, a thick sheet, a postcard or an OHP sheet).

Figure 3:
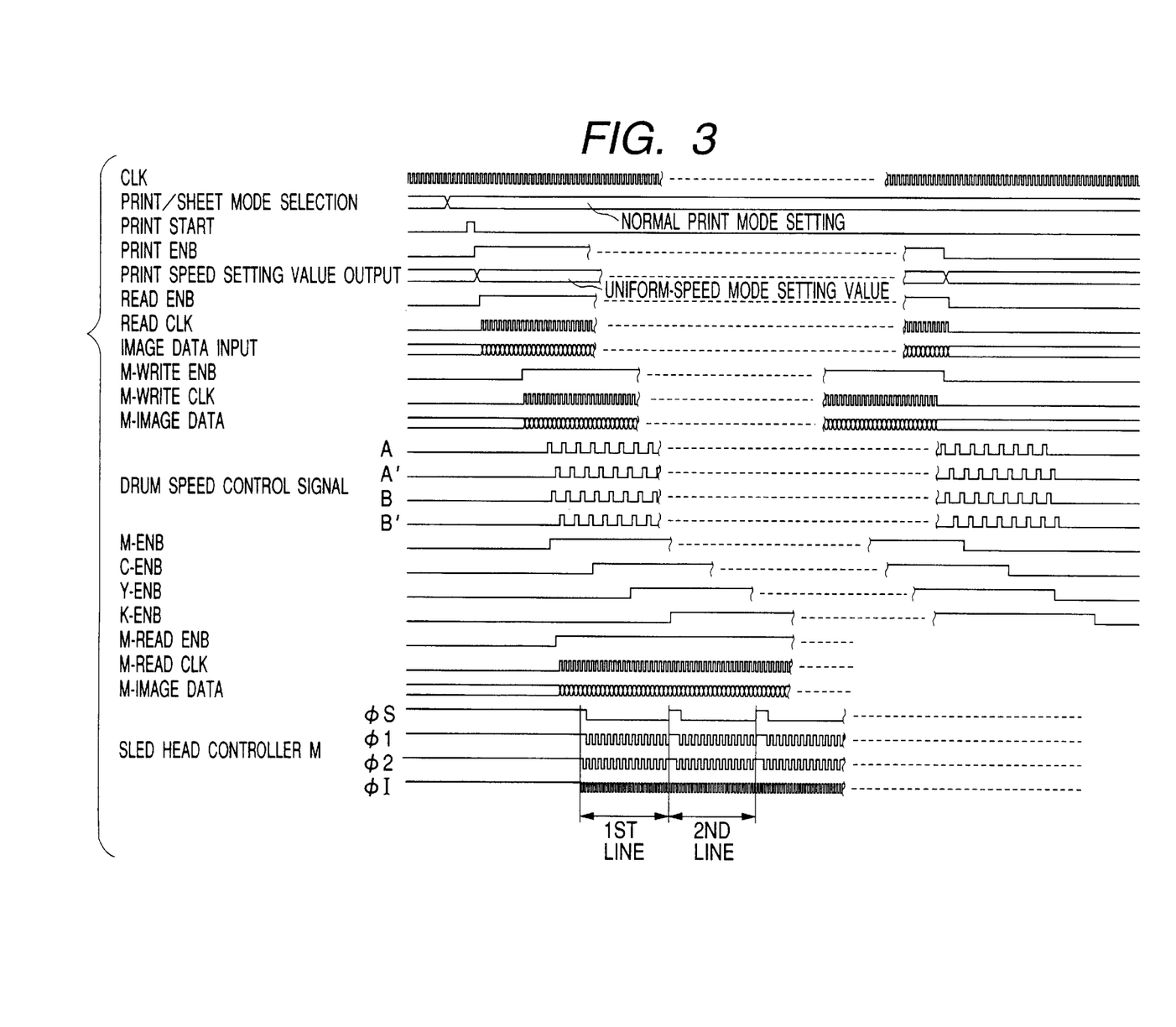
FIG. 3 is a timing chart showing an example of timing of each part shown in FIG. 1 in ordinary printing i.e., printing speed is maximum)
Figure 4:
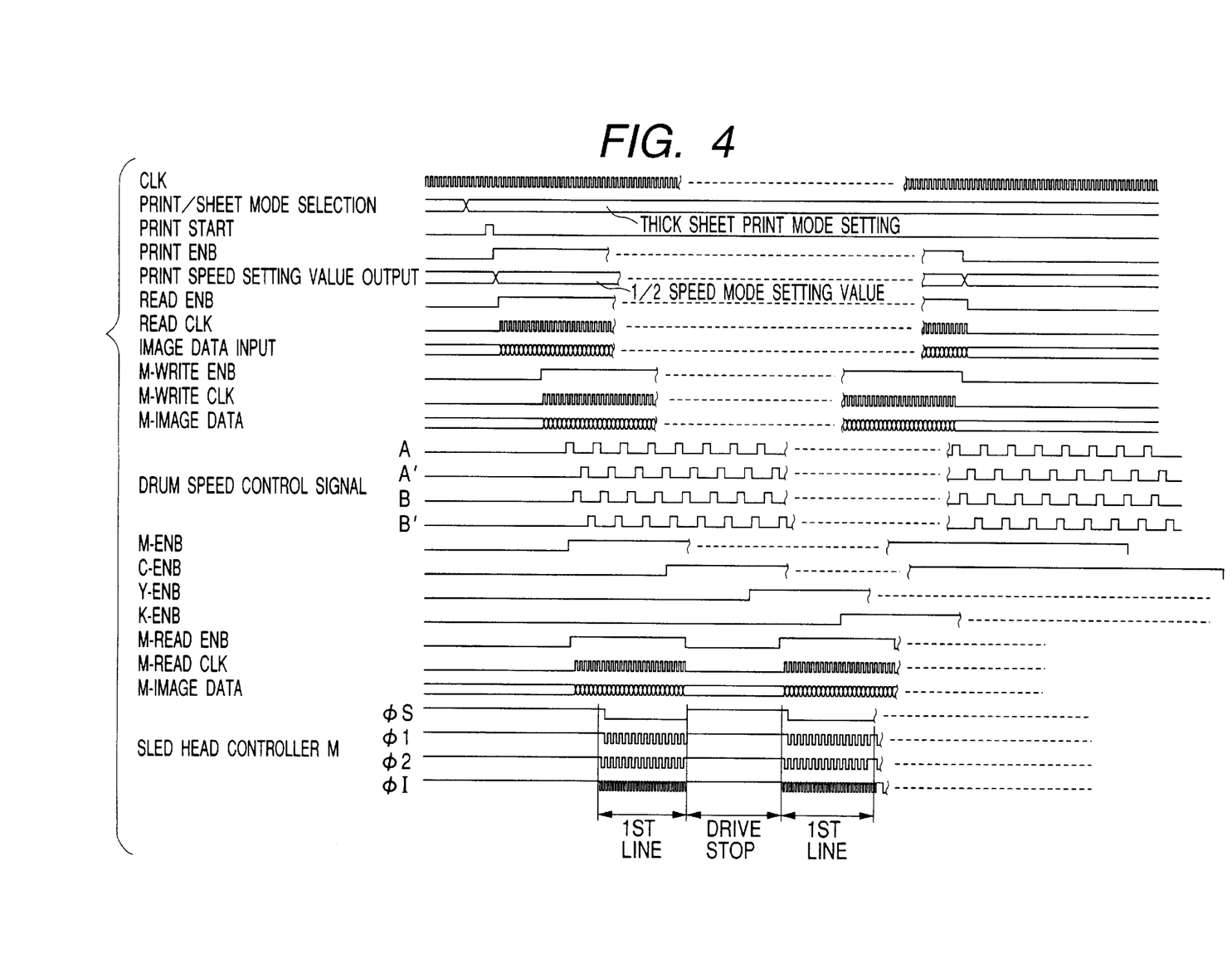
FIG. 4 is a timing chart showing an example of timing of each part shown in FIG. 1 in thick sheet printing (i.e., printing speed is 1/2)

The CPU 1001 which received the set print mode decelerates the printing speed to $1/2^n$ according to the received print mode. As a deceleration method, there is a method for frequency-dividing a main clock (CLK) supplied from the clock generation unit 1003 into $1/2^n$. An example of timing at each part shown in FIG. 1 in the ordinary printing (the printing speed is maximum) is illustrated in FIG. 3, and an example of timing at each part shown in FIG. 1 in the thick sheet printing (the printing speed is 1/2) is illustrated in FIG. 4.

When the SLED head controller 1006M receives from the CPU 1001 the print mode signal and the enable signal for the M image formation unit 317, the controller 1006M causes a contained driving signal generation unit to generate a signal necessary to drive the SLED head 210. Further, the SLED head controller 1006M outputs a read clock M-READ CLK and a read enable signal M-READ ENB for receiving the image data from the image memory 1005M, and receives the image data from the image memory 1005M. Further, the SLED head controller 1006M also generates a start pulse $\phi S$, shift pulses $\phi 1$ and $\phi 2$, and image data $\phi I$ which are necessary to drive the SLED head 210.

Figure 5:
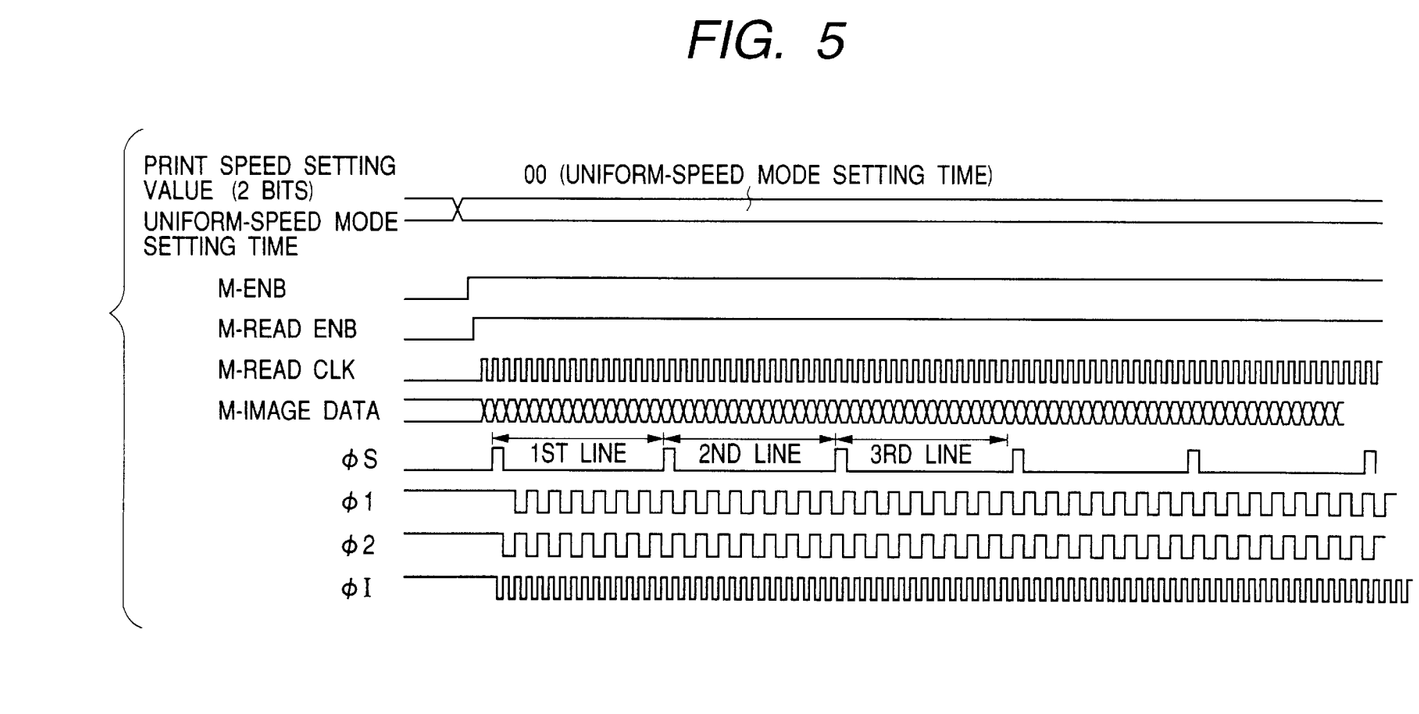
FIG. 5 is a timing chart showing an example of timing of each signal input/output to/from a SLED head controller 1006M.

An example of timing of each signal input/output to/from the SLED head controller 1006M is illustrated in FIG. 5. Namely, FIG. 5 shows driving waveforms of the SLED head controller 1006M at uniform speed time.

When the printing speed is changed to $1/2^n$ (n is a positive integer), the SLED head controller 1006M repeats the cycle to perform exposure control for one line and then stop the exposure control for the lines corresponding to the $1/2^n$ speed. For example, in the 1/2 speed (i.e., n=1), transfer and light emission driving are performed at the initially set maximum speed, and the cycle when the exposure control for one line is stopped after the one-line exposure control is repeated. Namely, the exposure control is stopped for every other line. Further, for example, in the 1/4 speed (i.e., n=2), transfer and light emission driving are performed at the initially set maximum speed, and the cycle when the exposure control for three lines is stopped after the one-line exposure control is repeated.

The above exposure control and the stop of the exposure control will be explained more in detail. In the SLED head controller 1006M by which the print mode signal from the CPU 1001 was received, when the printing speed is changed to $1/2^n$, the counter in the SLED head controller 1006M acts as an n-bit counter. This n-bit counter counts leading edges of the start pulse $\phi S$. It should be noted that the level of this start pulse $\phi S$ is H (high level) when the image formation apparatus is initialized.

For example, in the 1/2 speed, since n=1, the counter acts as a one-bit counter. When the count value of this counter is "0", an L (low-level) head driving control signal from the counter, shift pulses $\phi 1$ and $\phi 2$, image data $\phi I$, and a start pulse $\phi S$ are OR-calculated by the SLED head controller 1006M. Then, the shift pulses $\phi 1$ and $\phi 2$, the image data $\phi I$, and the start pulse $\phi S$ are supplied to the SLED head 210 as it is, and the exposure control for one line is performed.

When the count value of the counter is "1", an H (high-level) head driving control signal from the counter, the shift pulses $\phi 1$ and $\phi 2$, the image data $\phi I$, and the start pulse $\phi S$ are OR-calculated by the SLED head controller 1006M. Then, the shift pulses $\phi 1$ and $\phi 2$, the image data $\phi I$, and the start pulse $\phi S$, of which levels are all H, are supplied to the SLED head 210, and the exposure control for one line is stopped.

After that, the cycle when the exposure control for one line is stopped after the one-line exposure control is repeated.

Figure 6:
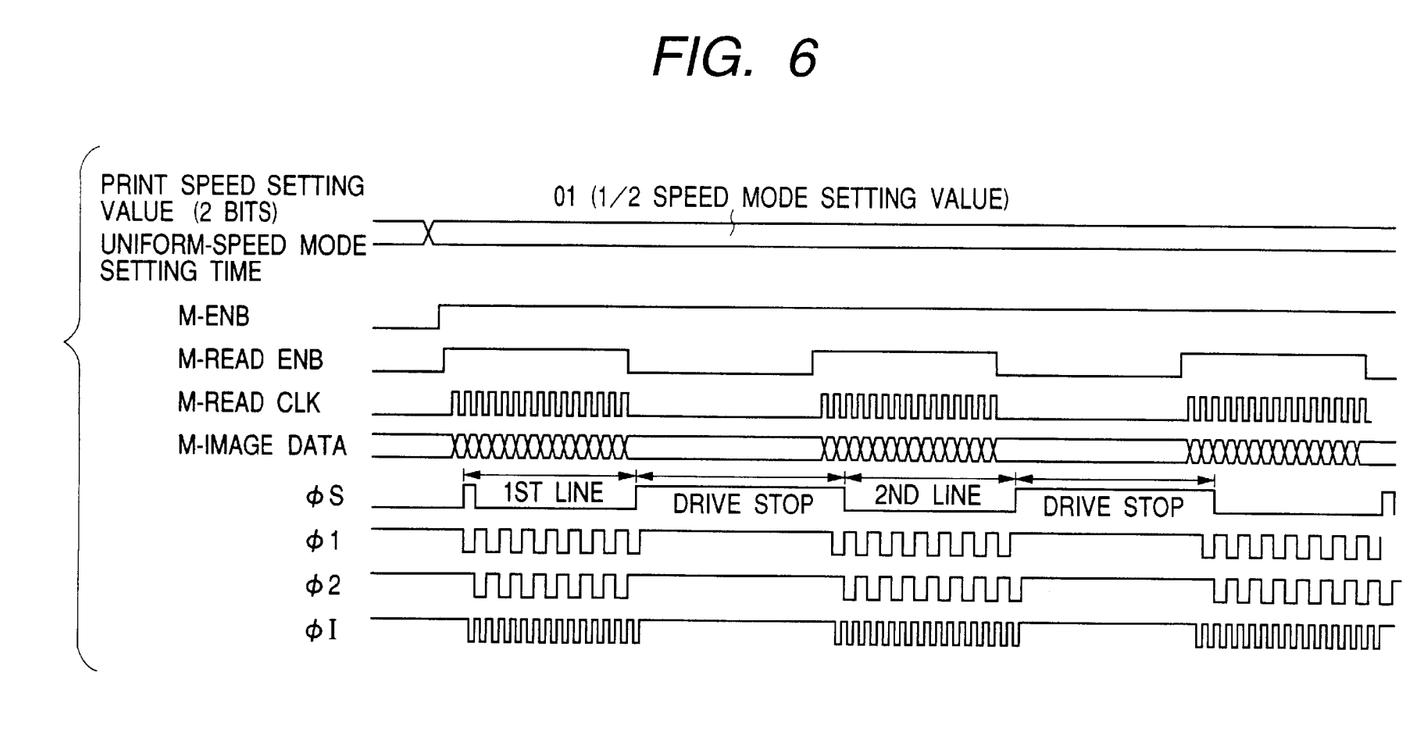
FIG. 6 is a timing chart showing an example of timing of each signal input/output to/from the SLED head controller 1006M at the time of 1/2 printing speed.

An example of timing of each signal input/output to/from the SLED head controller 1006M in the 1/2 speed is illustrated in FIG. 6. Namely, FIG. 6 shows driving waveforms of the SLED head controller 1006M at 1/2 speed time.

For example, in the 1/4 speed, since n=2, the counter acts as a two-bit counter.

When the count value of this counter is "00", the L head driving control signal from the counter, the shift pulses $\phi 1$ and $\phi 2$, the image data $\phi I$, and the start pulse $\phi S$ are OR-calculated by the SLED head controller 1006M. Then, the shift pulses $\phi 1$ and $\phi 2$, the image data $\phi I$, and the start pulse $\phi S$ are supplied to the SLED head 210 as it is, and the exposure control for one line is performed.

When the count value of the counter is "01", the H head driving control signal from the counter, the shift pulses $\phi 1$ and $\phi 2$, the image data $\phi I$, and the start pulse $\phi S$ are OR-calculated by the SLED head controller 1006M. Then, the shift pulses $\phi 1$ and $\phi 2$, the image data $\phi I$, and the start pulse $\phi S$ of which levels are all H are supplied to the SLED head 210, and the exposure control for one line is stopped.

When the count value of the counter is "10", the H head driving control signal from the counter, the shift pulses $\phi 1$ and $\phi 2$, the image data $\phi I$, and the start pulse $\phi S$ are OR-calculated by the SLED head controller 1006M. Then, the shift pulses $\phi 1$ and $\phi 2$, the image data $\phi I$, and the start pulse $\phi S$ of which levels are all H are supplied to the SLED head 210, and the exposure control for one line is stopped.

When the count value of the counter is "11", the H head driving control signal from the counter, the shift pulses $\phi 1$ and $\phi 2$, the image data $\phi I$, and the start pulse $\phi S$ are OR-calculated by the SLED head controller 1006M. Then, the shift pulses $\phi 1$ and $\phi 2$, the image data $\phi I$, and the start pulse $\phi S$ of which levels are all H are supplied to the SLED head 210, and further the exposure control for one line is stopped.

After then, the cycle when the exposure control for three lines is stopped after the one-line exposure control is repeated.

Figure 7:
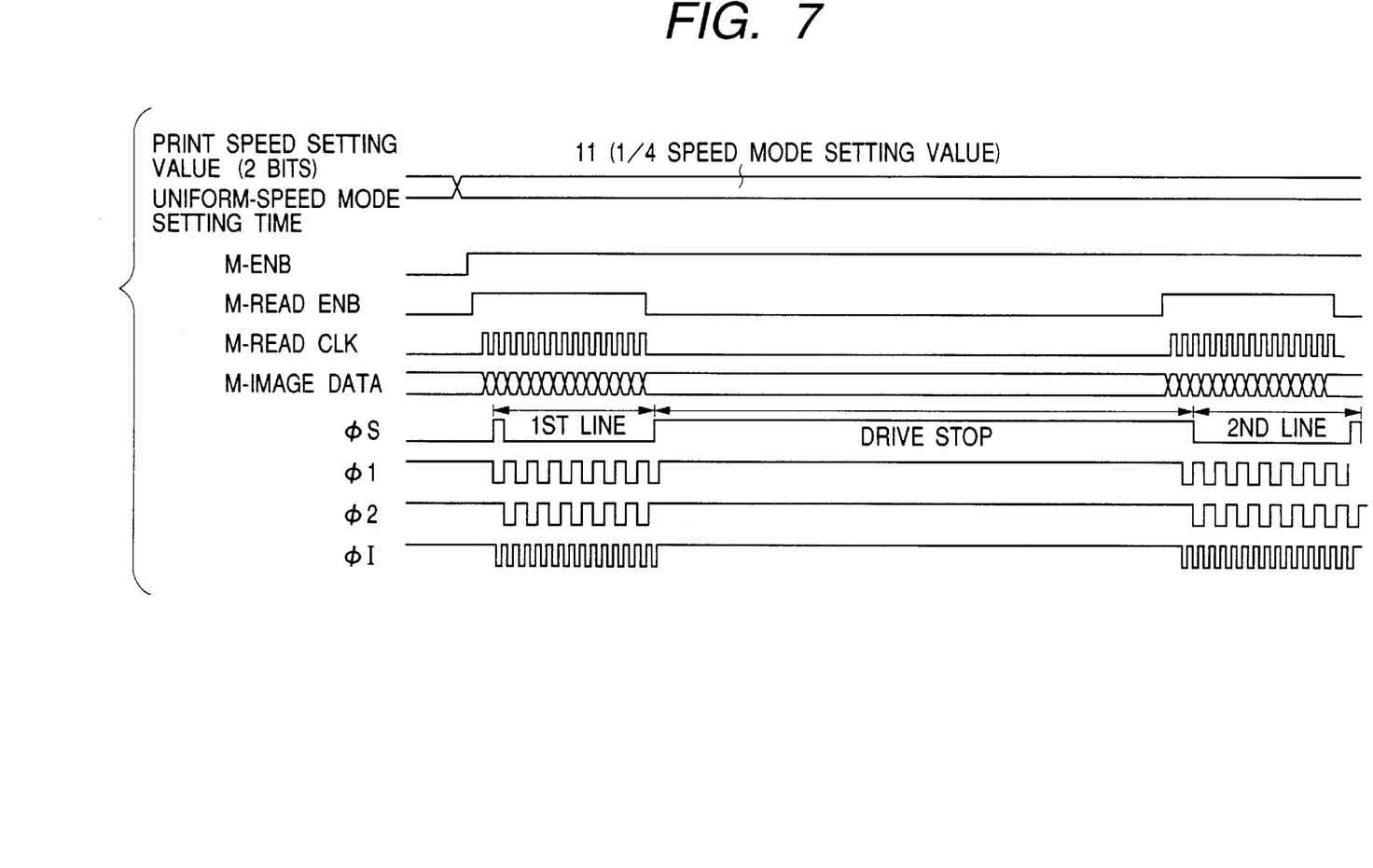
FIG. 7 is a timing chart showing an example of timing of each signal input/output to/from the SLED head controller 1006M at the time of 1/4 printing speed.

An example of timing of each signal input/output to/from the SLED head controller 1006M in the 1/4 speed is illustrated in FIG. 7. Namely, FIG. 7 shows driving waveforms of the SLED head controller 1006M at 1/4 speed time.

As above, the operation of the SLED head controller 1006M was explained. Since the SLED head controllers 1006M, 1006C, 1006Y and 1006K essentially perform the same operation, explanation of the operations of the SLED head controllers 1006C, 1006Y and 1006K will be omitted.

As explained above, since the present embodiment has the above-described structure, it is possible to reduce image unevenness due to light emission of the transfer element.

Although the present invention was explained by using the preferred embodiment, the present invention is not limited to it. Namely, it is obvious that various modifications and changes are possible in the present invention without departing from the spirit and scope of the appended claims.

What is claimed is:

1. An image formation apparatus which can change process speed, comprising:

a recording element array having plural recording elements to perform recording on a recording medium;

scanning means for scanning said recording element array;

control means for performing control in a low process speed mode such that a non-recording time during which no image is recorded is inserted between a recording time during which image data of one line is recorded and a recording time during which image data of a next one line is recorded; and inhibition means for inhibiting said scanning means from scanning said recording element array in the non-recording time of the low process speed mode.

2. An apparatus according to claim 1, wherein the scanning speed of said scanning means in a normal process speed mode is equal to the scanning speed of said scanning means in the low process speed mode.

3. An apparatus according to claim 2, wherein, when the process speed of the low process speed mode is $1/2^n$ (n is a positive integer) of the process speed of the normal process speed mode, the non-recording time is $(2^n-1)$ times of the recording time.

4. An apparatus according to claim 1, further comprising a SLED (self-scanning-type light emission diode) chip in which a transfer element array for scanning said recording element array is integrated with said recording element array.

5. An apparatus according to claim 4, wherein said scanning means scans said recording element array by inputting a two-phase pulse signal to said transfer element array.

6. An apparatus according to claim 1, further comprising:

a photosensitive body on which a latent image is formed by said recording element array;

development means for developing the latent image on said photosensitive body;

transfer means for transferring the developed image to a transfer medium; and fixing means for fixing the image on the transfer medium.

7. An apparatus according to claim 6, wherein plural recording element arrays, said photosensitive body and said development means are provided in correspondence with plural colors.

8. An apparatus according to claim 6, wherein said image formation apparatus changes the process speed according to a kind of transfer medium.

9. An image formation method in which process speed can be changed and a recording element array is used, said method comprising the steps of:

in a low process speed mode, providing a recording time during which an image of one line is recorded, and a non-recording time, during which no image is recorded, between the recording time of the one line and a recording time during which an image of a next line is recorded;

scanning the recording element array to drive a recording element on the basis of image data in the recording time; and inhibiting the scanning to the recording element in the non-recording time.

10. A method according to claim 9, wherein the scanning speed of a scanning means in a normal process speed mode is equal to the scanning speed of the scanning means in the low process speed mode.

11. A method according to claim 10, wherein, when the process speed of the low process speed mode is $1/2^n$ (n is a positive integer) of the process speed of the normal process speed mode, the non-recording time is $(2^n-1)$ times of the image recording time.

12. A method according to claim 9, wherein a SLED (self-scanning type light emission diode) chip in which a transfer element array for scanning the recording element array is integrated with the recording element array is provided.

13. A method according to claim 12, wherein the scanning means scans the recording element by inputting a two-phase pulse signal to the transfer element array.

14. A method according to claim 9, further comprising the steps of:

forming a latent image on a photosensitive body by using the recording element array;

developing the latent image on the photosensitive body; and transferring the developed image to a transfer medium.

15. A method according to claim 14, further comprising the step of forming and overlapping the images of plural colors.

16. A method according to claim 9, further comprising the step of changing the process speed according to a kind of transfer medium.

* * * * *

UNITED STATES PATENT AND TRADEMARK OFFICE
CERTIFICATE OF CORRECTION

PATENT NO. : 6,442,361 B1
DATED : August 27, 2002
INVENTOR(S) : Mitsuo Shiraishi et al.

It is certified that error appears in the above-identified patent and that said Letters Patent is hereby corrected as shown below:

Column 1,
Line 40, "referred" should read -- referred to --; and
Line 58, "condition the same" should read -- the same condition --.

Column 2,
Line 32, "such" should be deleted; and
Line 67, "driven" should read -- in a driving state --.

Column 4,
Line 43, "sub" should read -- sub- --.

Column 5,
Line 9, "sub scanning" should read -- sub-scanning --; and
Line 14, "an" should read -- a --.

Column 6,
Line 66, "enables" should read -- enable --.

Column 7,
Line 3, "maximum" should read -- maximized --.

Signed and Sealed this

Eighteenth Day of March, 2003

JAMES E. ROGAN
*Director of the United States Patent and Trademark Office*